US007002752B2

(12) United States Patent
Chen et al.

(10) Patent No.: US 7,002,752 B2
(45) Date of Patent: Feb. 21, 2006

(54) THREE-PANEL COLOR MANAGEMENT SYSTEMS AND METHODS

(75) Inventors: Jianmin Chen, Superior, CO (US); Michael G. Robinson, Boulder, CO (US); Gary D. Sharp, Boulder, CO (US); Jonathan R. Birge, Cambridge, MA (US)

(73) Assignee: ColorLink, Inc., Boulder, CO (US)

( * ) Notice: Subject to any disclaimer, the term of this patent is extended or adjusted under 35 U.S.C. 154(b) by 1 day.

(21) Appl. No.: 10/713,548

(22) Filed: Nov. 14, 2003

(65) Prior Publication Data

US 2004/0136067 A1 Jul. 15, 2004

Related U.S. Application Data

(63) Continuation-in-part of application No. 10/294,426, filed on Nov. 14, 2002, and a continuation-in-part of application No. 10/000,227, filed on Nov. 30, 2001, now Pat. No. 6,816,309.

(51) Int. Cl.
*G02B 27/14* (2006.01)
*G02B 21/14* (2006.01)

(52) U.S. Cl. .......................... 359/634; 353/20; 353/82; 353/84

(58) Field of Classification Search ................ 359/634; 353/20, 31, 34, 37, 82, 84
See application file for complete search history.

(56) References Cited

U.S. PATENT DOCUMENTS

| 2,347,582 A | 4/1944 | Ulffers |
| 2,607,272 A | 8/1952 | Bond |
| 3,835,459 A | 9/1974 | Luke et al. |
| 4,461,542 A | 7/1984 | Gagnon |
| 4,500,178 A | 2/1985 | Yeh |
| 4,548,479 A | 10/1985 | Yeh |
| 4,772,104 A | 9/1988 | Buhrer |
| 4,991,938 A | 2/1991 | Buhrer et al. |
| 5,062,694 A | 11/1991 | Bair |
| 5,202,744 A | 4/1993 | Louis |
| 5,374,968 A | 12/1994 | Haven et al. |
| 5,375,006 A | 12/1994 | Haas |
| 5,534,949 A | 7/1996 | Baron |
| 5,619,352 A | 4/1997 | Koch et al. |
| 5,751,384 A | 5/1998 | Sharp |

(Continued)

FOREIGN PATENT DOCUMENTS

WO   WO 02/37175   5/2002

OTHER PUBLICATIONS

International Search Report from copending PCT/US03/36803 application mailed Apr. 27, 2004.

*Primary Examiner*—Ricky Mack
(74) *Attorney, Agent, or Firm*—Baker & McKenzie LLP

(57) ABSTRACT

The present application describes color management architecture for a three-panel projection system that utilizes color selective polarization filters (CSPF) and polarizing beam splitting elements. An exemplary embodiment describes a color management architecture with a dichroic input beam splitter and three polarizing beam splitters. An output polarizing beam splitter is used as an analyzer. The color management system architecture can isolate any color channel from those remaining whose separation and combination are then carried out by a single beamsplitting element. The disclosed embodiments also provide an improvement in the ANSI contrast. In some embodiments, an achromatic quarter-wave plate is used in combination with a color filter to block the light reflected from projection optics.

52 Claims, 9 Drawing Sheets

U.S. PATENT DOCUMENTS

| | | |
|---|---|---|
| 5,892,612 A | 4/1999 | Miller et al. |
| 5,986,815 A | 11/1999 | Bryars |
| 6,042,234 A | 3/2000 | Itoh |
| 6,089,719 A | 7/2000 | Lin |
| 6,113,239 A | 9/2000 | Sampsell et al. |
| 6,183,091 B1 | 2/2001 | Johnson et al. |
| 6,339,492 B1 | 1/2002 | Terahara et al. |
| 6,343,864 B1 | 2/2002 | Tajiri |
| 6,373,614 B1 | 4/2002 | Miller |
| 6,375,330 B1 | 4/2002 | Mihalakis |
| 6,384,972 B1 | 5/2002 | Chuang |
| 6,419,362 B1 | 7/2002 | Ikeda et al. |
| 6,454,416 B1 | 9/2002 | Aoto et al. |
| 6,490,087 B1 | 12/2002 | Fulkerson et al. |
| 6,577,445 B1 | 6/2003 | Damask |
| 6,819,497 B1 * | 11/2004 | Suzuki et al. ............. 359/634 |
| 2002/0001135 A1 | 1/2002 | Berman et al. |
| 2002/0003610 A1 | 1/2002 | Park et al. |
| 2002/0089679 A1 | 7/2002 | Yi |
| 2002/0105619 A1 | 8/2002 | Lin |
| 2003/0151833 A1 * | 8/2003 | Berman et al. ............ 359/831 |
| 2003/0227597 A1 | 12/2003 | Siverstein et al. |

* cited by examiner

THREE-PANEL COLOR MANAGEMENT SYSTEMS AND METHODS

PRIORITY CLAIM AND RELATED APPLICATIONS

The present application is a continuation-in-part application from and claims priority to U.S. application Ser. No. 10/000,227 filed Nov. 30, 2001 now U.S. Pat. No. 6,816,309 and U.S. application Ser. No. 10/294,426 filed Nov. 14, 2002 both entitled "Compensated Color Management Systems and Methods," both applications having Jianmin Chen, Michael G. Robinson, Jonathon R. Birge, and Gary D. Sharp, as inventors, and having as assignee ColorLink, Inc., the assignee of the present application. These applications are incorporated herein by reference in their entirety for all purposes.

FIELD OF THE INVENTION

The present invention relates generally to color management in projection displays and, more particularly, to color management architectures for three-panel projection systems that utilize color selective polarization filters (CSPF) and polarizing beam splitting (PBS) elements.

BACKGROUND

It is generally desirable for projection systems to produce high quality images while being compact and inexpensive. In prior art transmissive systems using polysilicon liquid crystal panels, high contrast is achieved by situating each panel between crossed sheet polarizers. Color management beam splitters/combiners and other optics are external to these units, insuring that polarization is not contaminated and contrast degraded.

In projection systems using reflective panels, such as liquid crystal on silicon (LCOS) displays, beam routing is frequently accomplished using polarizing beam splitters. PBSs are four-port devices, comprising an input port, an output port, and a reflective panel port, with the fourth port typically unused. The behavior of thin-film PBS cubes, for instance, is such that s-polarized light is reflected, while orthogonal, p-polarized light is substantially transmitted.

A number of four-panel or "quad" architectures have been described in prior applications such as U.S. patent application Ser. Nos. 09/736,105, and 10/294,426, for the separation, modulation, and re-combination of three primary colors. These functions may be accomplished using new architectures for color management that are described in the present application.

SUMMARY

The present invention relates to color management architectures in video projection systems. Specifically, the described architectures employ three polarizing beamsplitter cubes (PBSs) and a dichroic beamsplitter to achieve color separation and recombination of red, green and blue primary color bands to illuminate and project light from three reflective video display panels. Color separation and recombination with the PBSs is achieved through polarization encoding of the separate color bands by color selective polarization filters. These architectures further provide for systems in which the constituent PBSs are used to analyze the reflected light and which do not require external polarizing elements for light analysis. Two of the three display panels are analyzed in transmission by their neighboring PBSs, whereas the third panel, which shares a PBS with another, is analyzed in transmission by the output PBS.

For the above-described color management architectures, the three display panels are placed in an 'L' shaped three cube assembly whose output port is defined. Unlike prior three-panel/three-PBS architectures, which "notch" out the green spectrum from between the red and blue spectrums for individual manipulation by a PBS/display panel couplet, see, e.g., U.S. Patent Application No. 2002/0001135, certain of the present architectures separate either blue or red first, leaving colors from adjacent wavelength bands to be manipulated between two panels by a single PBS. To accomplish this management of adjacent color bands through a single PBS, the present application recognizes the ability to mismatch color selective polarization filters to avoid color cross-talk in the region between the adjacent color bands. This allows blue light, for example to be treated separately to improve its contrast, which is an advantage because in many color management systems, blue contrast is often the most difficult to control. Other advantages of routing colors of adjacent wavelength bands to be manipulated between two panels by a single PBS include being able to tailor more effectively the PBS performance to the color bands that are then continuous in wavelength.

In addition to the adjacent color management techniques described above, the present invention can incorporate skew-ray compensating filters, such as described in commonly owned U.S. patent appl. Ser. No. 10/000,227, which is incorporated by reference in the present application. The use of these skew-ray compensating filters in the disclosed, particularly between adjacent PBSs and particularly in physically compact, high angle illumination (low f/#) implementations, can increase system performance.

DETAILED DESCRIPTION

Figure 1:
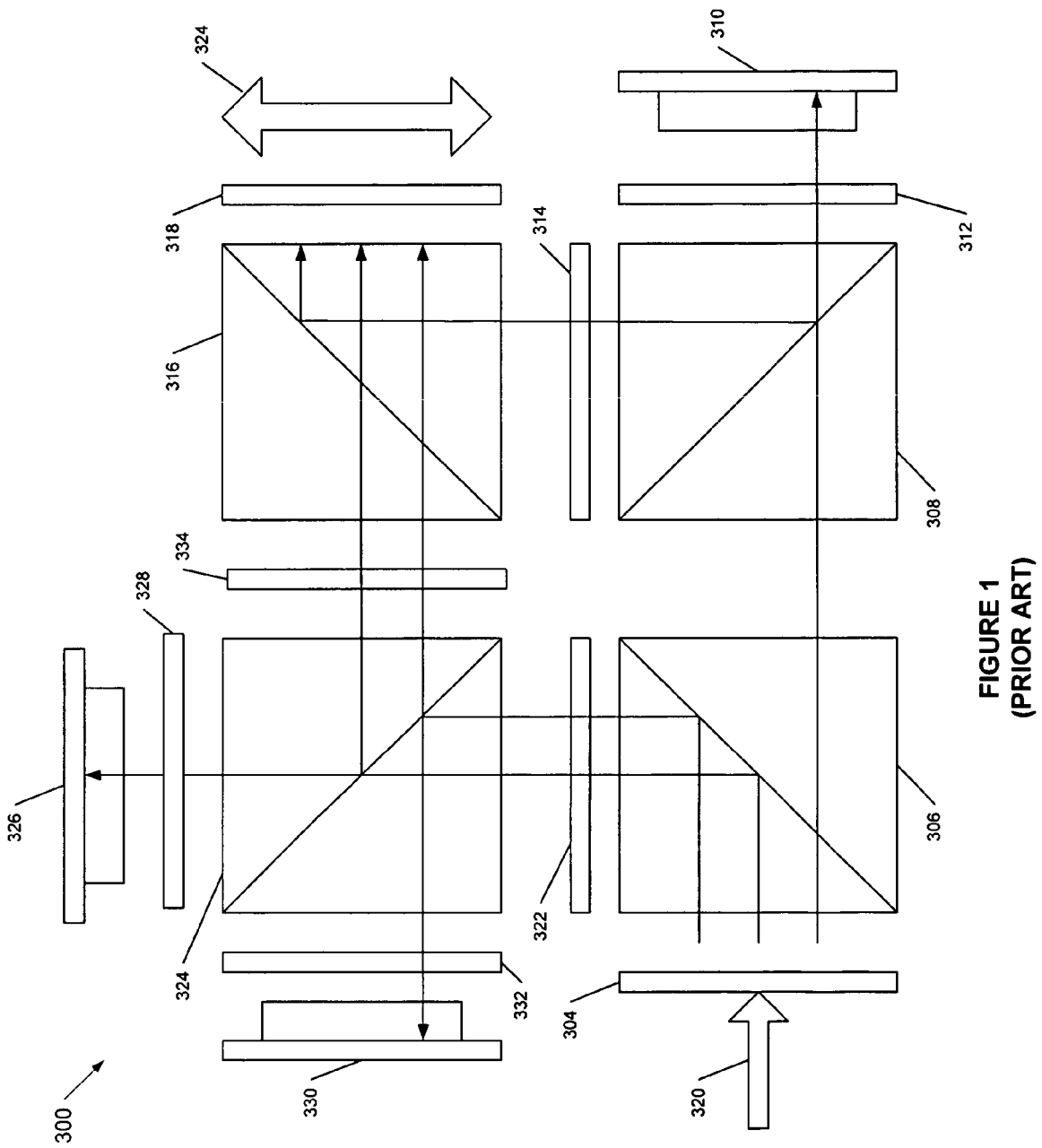
FIG. 1 shows an exemplary prior art "quad" color management system.

FIG. 1 shows an exemplary prior art "quad" color management system 300. In the system 300, an s-polarized white light 320 is incident on a first CSPF 304 that converts light of a first spectrum to the orthogonal polarization that is subsequently transmitted through the first PBS 306. Light that is complementary to the first spectrum remains s-polarized and is subsequently reflected by the first PBS 306. Light having the first spectrum is then transmitted by a second PBS 308 and is subsequently incident upon a first reflective panel 310, which includes an optional quarter-wave plate 312. In the ON-state, light reflected from the first reflective panel 310 is converted from p-polarization to s-polarization, thereby enabling the second PBS 308 to reflect the light through a first 0-oriented half-wave plate 314. The light is then reflected by a third PBS 316. The third PBS 316 reflects the first spectrum into a second CSPF 319, which converts light of the first spectrum to p-polarization, which it is then analyzed by a clean-up polarizer 324.

The incident light 302 of a second and third spectrums is reflected by the first PBS 306 onto a first compensating color selective polarization filter (CCSPF) 322, which reflects the state of polarization (SOP) of the second spectrum about a ±π/4 axis. Light of the second spectrum is transmitted through a fourth PBS 324 to a second reflective panel 326, which includes an optional quarter-wave plate 328. The first CCSPF 322 retains the SOP of the third spectrum. The third spectrum is subsequently reflected by the fourth PBS 324 to a third reflective panel 330, which includes an optional quarter-wave plate 332. In ON-state, light reflected from the second and third reflective panels 326, 330 returns to the PBS 324 with orthogonal states, so that light in the second and third spectra is incident on a second CCSPF 334. The second CCSPF 334 reflects the SOP of the second spectrum about a ±π/4 axis, thus restoring both spectra to p-polarization. The p-polarized light is then transmitted by the third PBS 316, the second CSPF 318 and the clean-up polarizer 324. The optional quarter-wave plates situated between each panel and PBS are configured to provide skew ray correction.

Figure 2A:
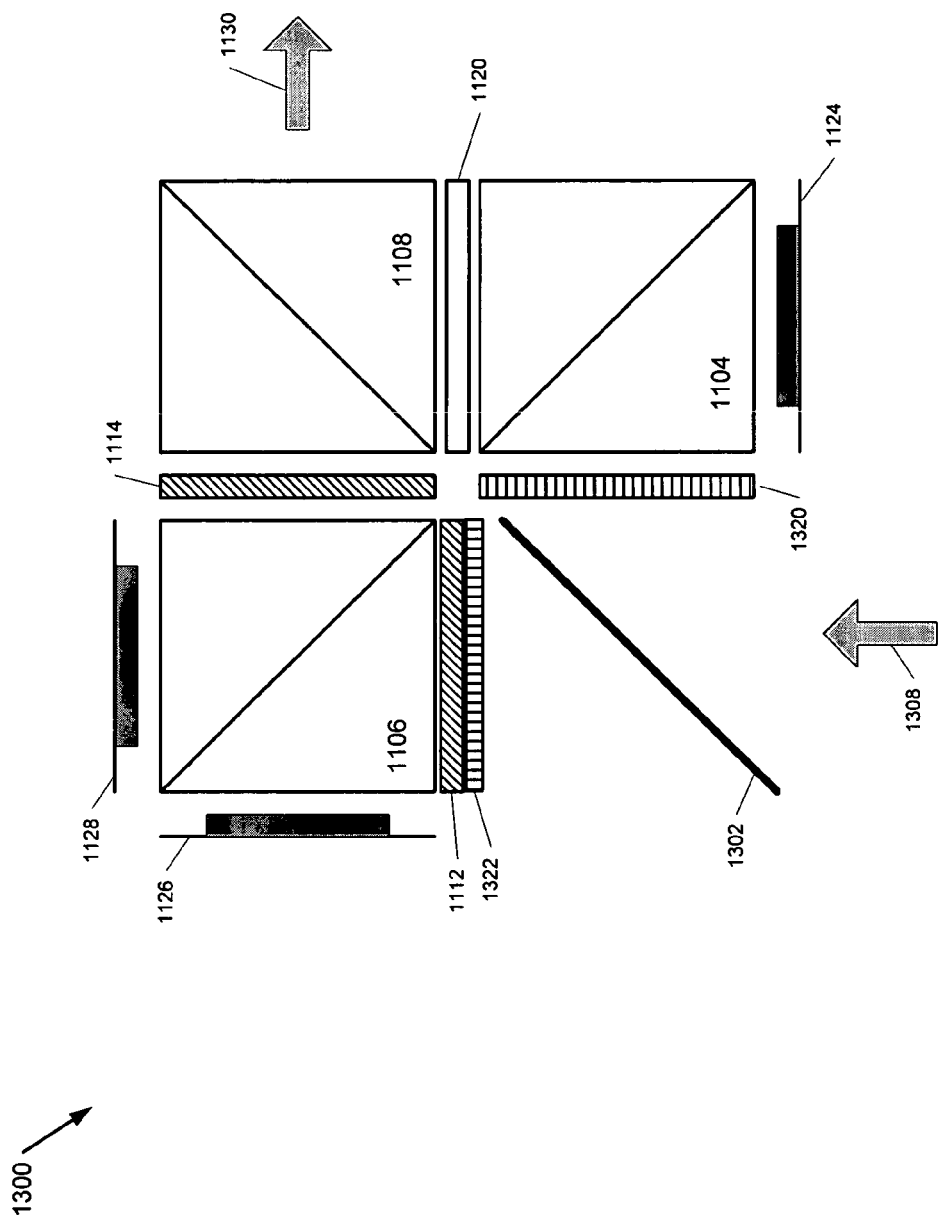
FIG. 2A shows an exemplary color management architecture for a projection system that includes a dichroic input beam splitter with polarizers.

FIG. 2A illustrates an exemplary color management architecture for a projection device 1300. The projection device 1300 includes a dichroic input beam splitter 1302 and three PBSs 1104, 1106, and 1108. The PBS maybe conventional cube PBSs, Moxtek wire grid polarizers, or any other suitable PBS. The projection device 1300 further includes a first CSP 1112 placed between the dichroic input beam splitter 1302 and the PBS 1106, a second CSP 1114 placed between the PBSs 1106 and 1108, a half-wave plate 1120 orientated at 45° placed between the PBSs 1104 and 1108. A first reflective panel 1122, a second reflective panel 1124, and a third reflective panel 1126 are configured to modulate a polarized input light beam 1128 to produce an output light beam 1130. All panels can include compensating elements such as quarter-wave plate.

The projection device 1300 further includes polarizers 1320 and 1322 at the output ports of the dichroic input beam splitter 1302. In one embodiment, the half-wave plate 1120 can be configured to rotate the polarization of the light modulated and reflected by the reflective panel 1124. In some embodiments, a color filter can be added to the half-wave plate 1120. Alternatively, the color filter can substitute the half-wave plate 1120.

The input light beam 1128 can be polarized or unpolarized and may be generated by any suitable light source, including, but not limited to an ultra-high pressure mercury (UHP) lamp, a xenon lamp, a fusion lamp, a light source according to application Ser. No. 60/358,517, which is incorporated herein in its entirety by this reference, or any other suitable light source. The light source also may include suitable illumination optics. The input light beam 1128 is incident upon the dichroic input beam splitter 1302, which reflects light of a first spectrum and transmits light of a second spectrum.

The reflected first spectrum of light is then incident upon the PBS 1104, which reflects and directs the first spectrum of light to be incident upon the reflective panel 1124. The reflective panel 1124 modulates and reflects the first spectrum of light. The modulated first spectrum of light then travels through the PBS 1104 and the half-wave plate 1120 oriented at 45°. The half-wave plate 1120 rotates the polarization of the modulated first spectrum of light to the orthogonal polarization direction such that the PBS 1108 will reflect the modulated first spectrum of light. The PBS 1108 reflects and directs the modulated first spectrum of light to form part of the output light beam 1130. The output light beam may be projected by any suitable projection optics or may otherwise be imaged for display.

The second spectrum of light, which is transmitted through the dichroic input beam splitter 1302, is incident upon the polarizer 1322 and the CSP 1112. The CSP 1112 rotates part of the second spectrum such that the PBS 1106 will reflect a first portion of the second spectrum of light to the reflective panel 1124 and allow a second portion of the second spectrum of light to be transmitted through the PBS 1106 to the reflective panel 1128. The reflective panel 1124 modulates and reflects the first portion of the second spectrum of light back through the PBS 1106 to the CSP 1114. The CSP 1114 does not rotate polarization of the light reflected from the reflective panel 1124 such that the light will be transmitted through the PBS 1108 and become part of the output light beam 1130. The reflective panel 1126 modulates and reflects the second portion of the second spectrum of light back into the PBS 1106, which reflects the light from the reflective panel 1126 toward the CSP 1114. The CSP 1114 rotates polarization of the light reflected from the reflective panel 1126 such that the light will be transmitted through the PBS 1108 and become part of the output light beam 1130. The CSP 1114 can be further configured to compensate the light reflected from the reflective panels 1126 and 1128 for skew rays.

The wavelengths of light in the transition region between the first and second portions of the second reflected light beam are defined in the absence of any external notch filtering by the transitions of filters 1112 and 1114. In the case where the second reflected beam has a continuous spectrum, e.g. the yellow 520–680 nm band, the transition slopes of the individual filters 1112 and 1114 that separate the red wavelengths (>600 nm) from those that are green (<570 nm) should not overlap significantly (<10%) to avoid low contrast with transition light (~570–600 nm) always directed towards panel 1126. This implies that the yellow transition of the filter 1112 should be at a longer wavelength than that of filter 1114 in this exemplary case.

Figure 2B:
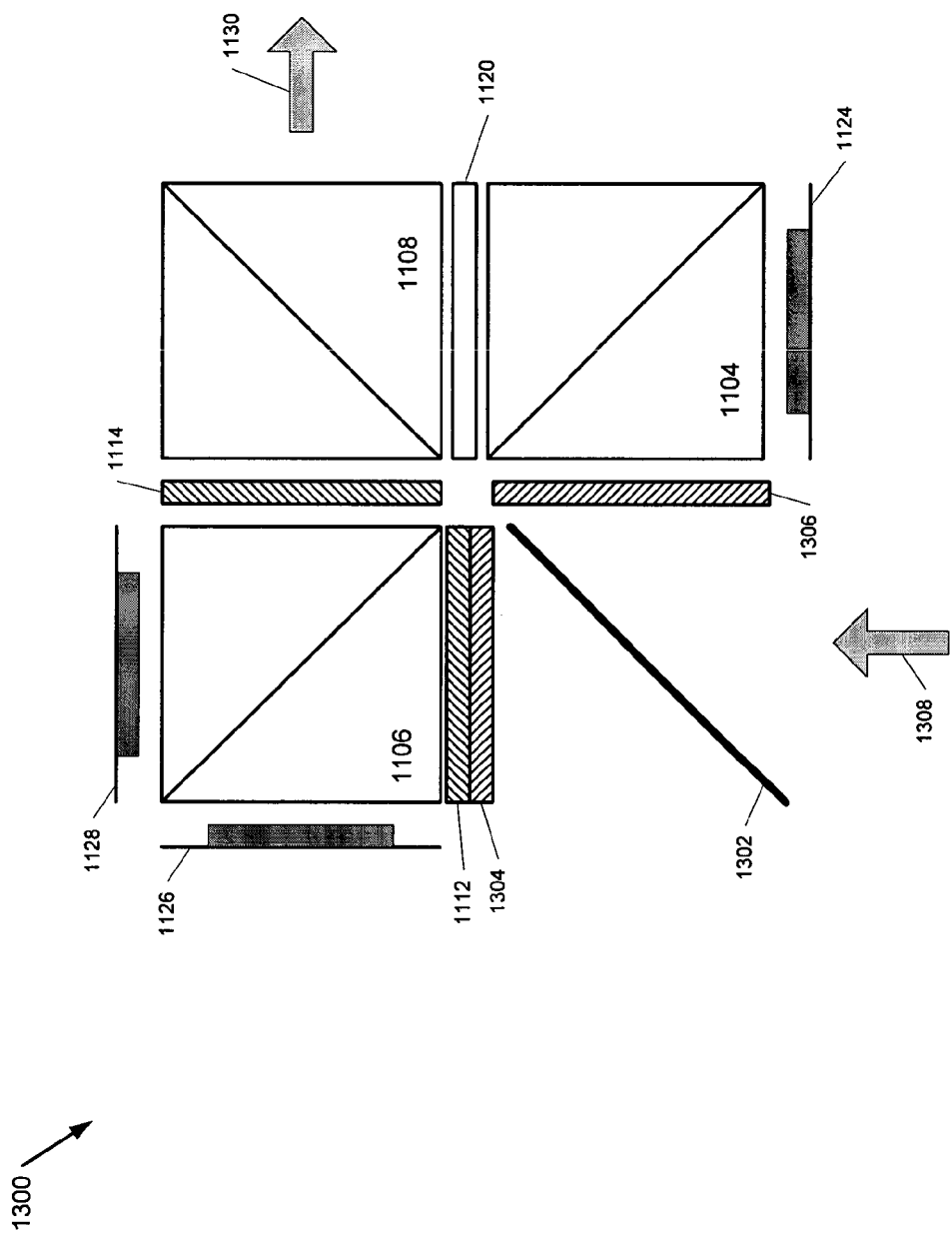
FIG. 2B shows the exemplary projection device 1300 of FIG. 2A with optional additional trim filters in place of polarizers.

FIG. 2B shows the exemplary projection device 1300 of FIG. 2A with optional additional trim filters 1304 and 1306 in place of the polarizers 1320 and 1322 at the output ports of the dichroic input beam splitter 1302. The trim filters 1304 and 1306 improve the color saturation. The input light 1308 can be primarily of a single polarization state.

Figure 2C:
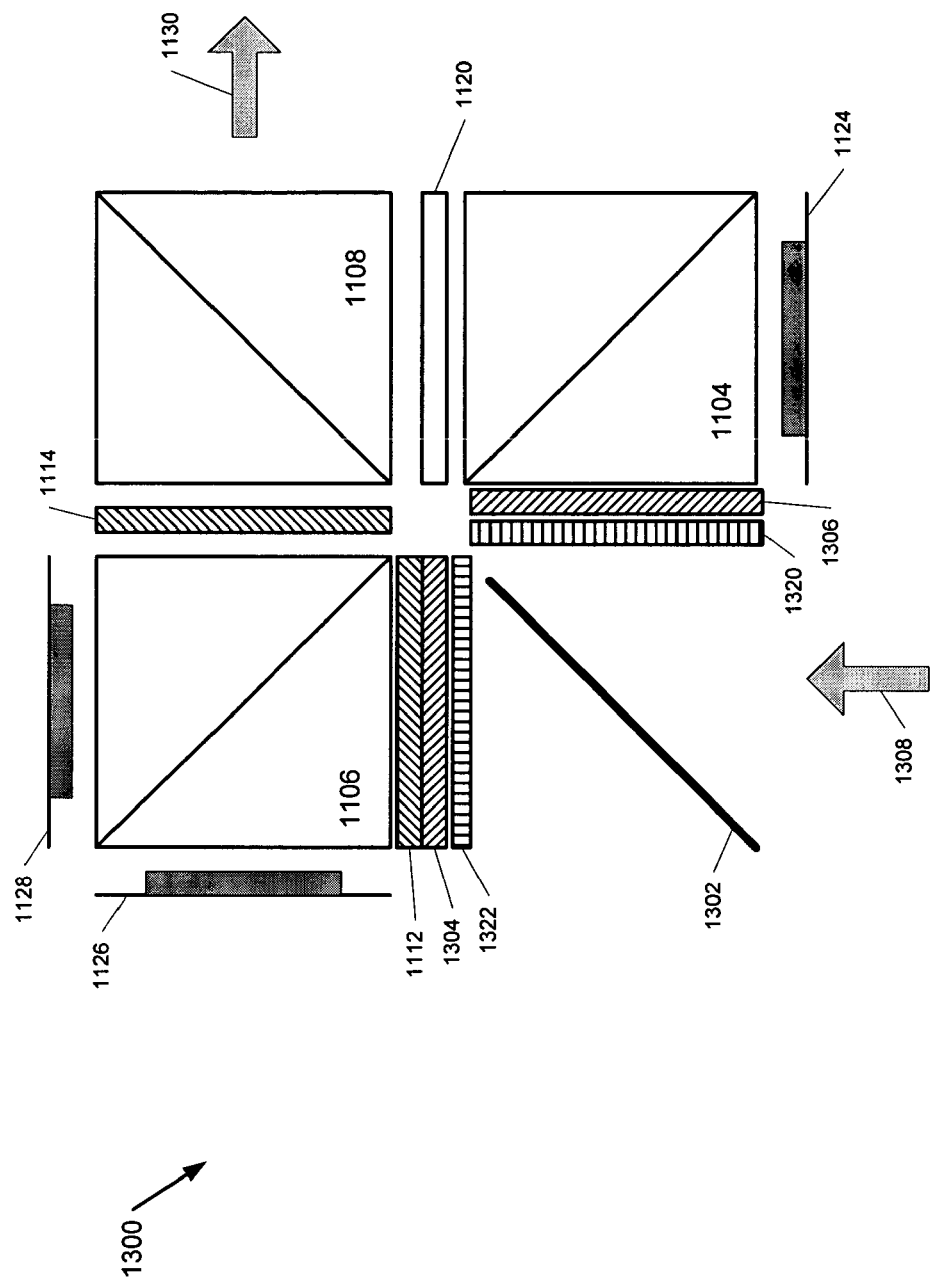
FIG. 2C shows the exemplary projection device 1300 of FIG. 2A with a combination of polarizers and extra trim dichroic filters.

FIG. 2C shows the exemplary projection device 1300 of FIG. 2A that includes both the polarizers 1320 and 1322, and extra trim dichroic filters 1304 and 1306 at the output ports of the dichroic input beam splitter 1302.

Figure 3:
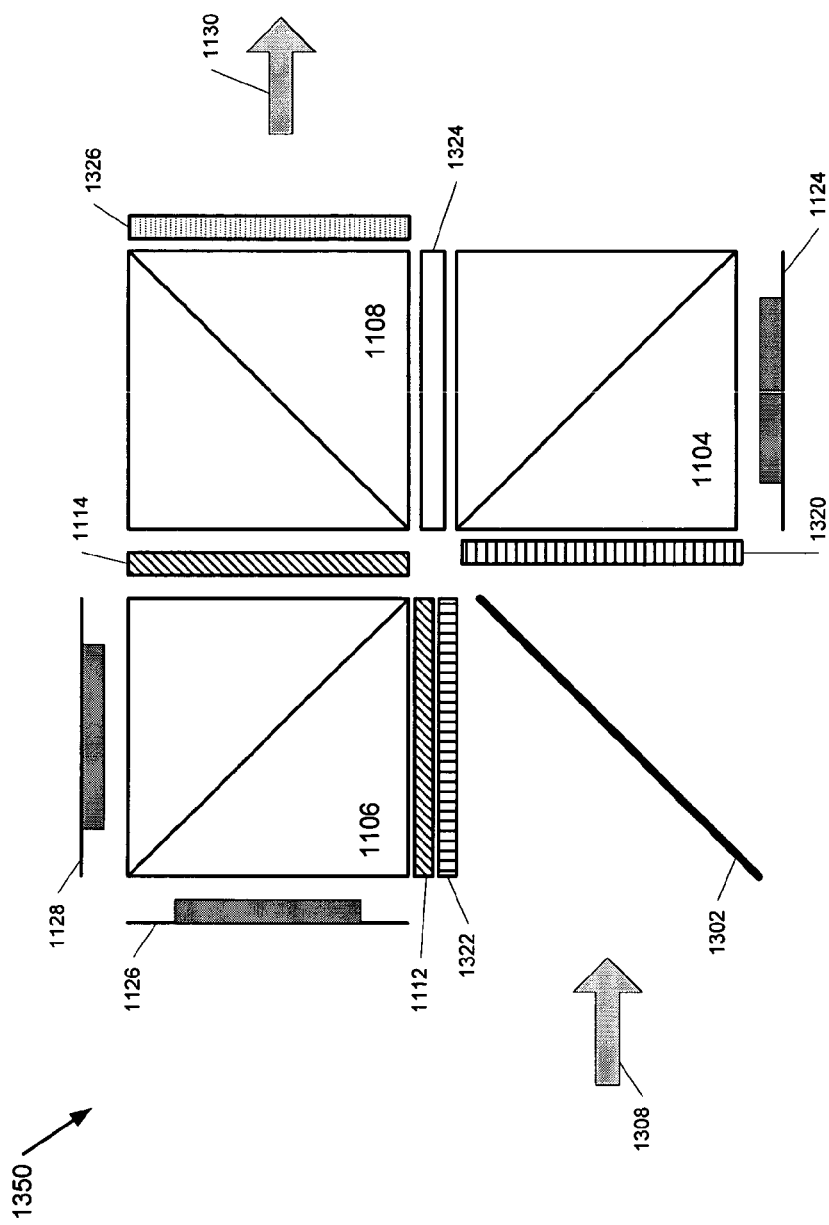
FIG. 3 illustrates a projection device that includes a dichroic input beam splitter with an output quarter-wave plate to compensate for reflection from a projection lens.

FIG. 3 illustrates a projection device 1350, which is an exemplary variation of the projection device 1300 shown and described in FIG. 2. An input light 1308 enters into the projection device 1350 from the left side of the dichroic input beam splitter 1302. In the present example, the dichroic input beam splitter 1302 is configured to transmit the blue spectrum and reflect the yellow spectrum. However, the dichroic input beam splitter 1302 can be configured to reflect and transmit any desired combination of spectra. For projection devices with modest f-number, such as f/2.8, additional extra trim dichroics, such as 1304 and 1306, may not be necessary. In the present example, the projection device 1350 is configured for f/2.8. Typically, dichroic beam splitters, such as dichroic input beam splitter 1302, do not preserve the polarization of the input light. Thus, to preserve the polarization of the input light 1308 or to allow operation with unpolarized input light 1308, polarizers 1320 and 1322 are placed at the output ports of the dichroic beam splitter 1302. Additionally, the trim filters 1304 and 1306 can also be placed at the output ports of the dichroic input beam splitter 1302 such as shown in FIG. 2C.

A red/cyan filter 1112 processes the reflected yellow spectrum. The red/cyan filter 1112 transforms the polarization state of red light while substantially maintaining that of cyan. A reflective panel 1128 modulates the red spectrum and a reflective panel 1126 modulates the green (and any blue) spectrum. A magenta/green filter 1114 transforms the polarization of red and green spectra at the output of the polarizing beam splitting element 1106, rotating the red (and any blue) light and leaving substantially unaffected the green light. An achromatic quarter-wave plate 1326 rotated at 45 degrees is placed at the output port of the polarizing beam splitting element 1108. A filter 1324 can be placed between the polarizing beam splitting elements 1104 and 1108. The filter 1324 rotates the polarization of the blue spectrum and does not affect the yellow spectrum. As explained below, filter 1324 functions in combination with a quarter-wave plate to improve the ANSI contrast. According to one embodiment, the quarter-wave plate 1326 can be achromatic over the visible spectrum.

"ANSI contrast," is a performance metric for comparing the contrast between a light part of a display and a dark part. The problem monitored with ANSI contrast measurement is the reflection back into a projection system of light from portions of a panel that correspond to bright areas in the display. Typically, the light coming off the bright areas of the panel can be reflected back into the projection device and light up the dark areas of the panel, which can result in increasing the intensity of the display's dark areas. One solution to avoid the unwanted reflections is to change the polarization of the reflected light. In the present example, when a part of the green panel is bright and a part of it is dark, the projected green light from the bright areas of the panel heads towards the projection lens (not shown) and is reflected back from the surfaces of elements within the projection lens. If the reflected green light has the same polarization as the incident light, then it travels back to the green panel where it can illuminate dark regions of the green panel with the incorrect polarization. This light can then be projected onto the screen, increasing the light level of the dark display regions and reducing ANSI contrast. To a viewer, low ANSI contrast results in a "washed out" appearance.

For example, to prevent green reflected light from hitting dark parts of any panel, the quarter-wave plate 1326 is able to alter the polarization of reflected light to be primarily s-polarized. This results in most of the green light being directed out of the system and away from any panel. When the projected green light exits the polarizing beam splitting element 1108, it is turned into predominantly circularly polarized light by the quarter-wave plate 1326. When the circularly polarized light is reflected off the projection lens and passes back through the quarter-wave plate 1326, the polarization of the reflected, opposite handedness predominantly circularly polarized light is changed to be substantially s-polarized. The s-polarized reflected light does not transmit through the output polarizing beam splitter 1108 and is reflected downwards towards the blue panel 1124. The filter 1324 is configured to rotate the polarization of the blue spectrum and leave green and red substantially unchanged. In the present example, the s-polarized reflected light is green light, thus, the filter 1324 does not rotate its polarization and the polarizing beam splitting element 1104 then prevents this s-polarized reflected light from striking the blue panel 1124. In this specific embodiment reflected red light is similarly prevented from striking a panel. Reflected blue light incident on panels can often be tolerated due to its relatively low perceived brightness. In the case where projection lenses are low in reflection the quarter wave may not be necessary and the filter 1324 may be replaced with a half-wave plate at 45 degrees.

Figure 4:
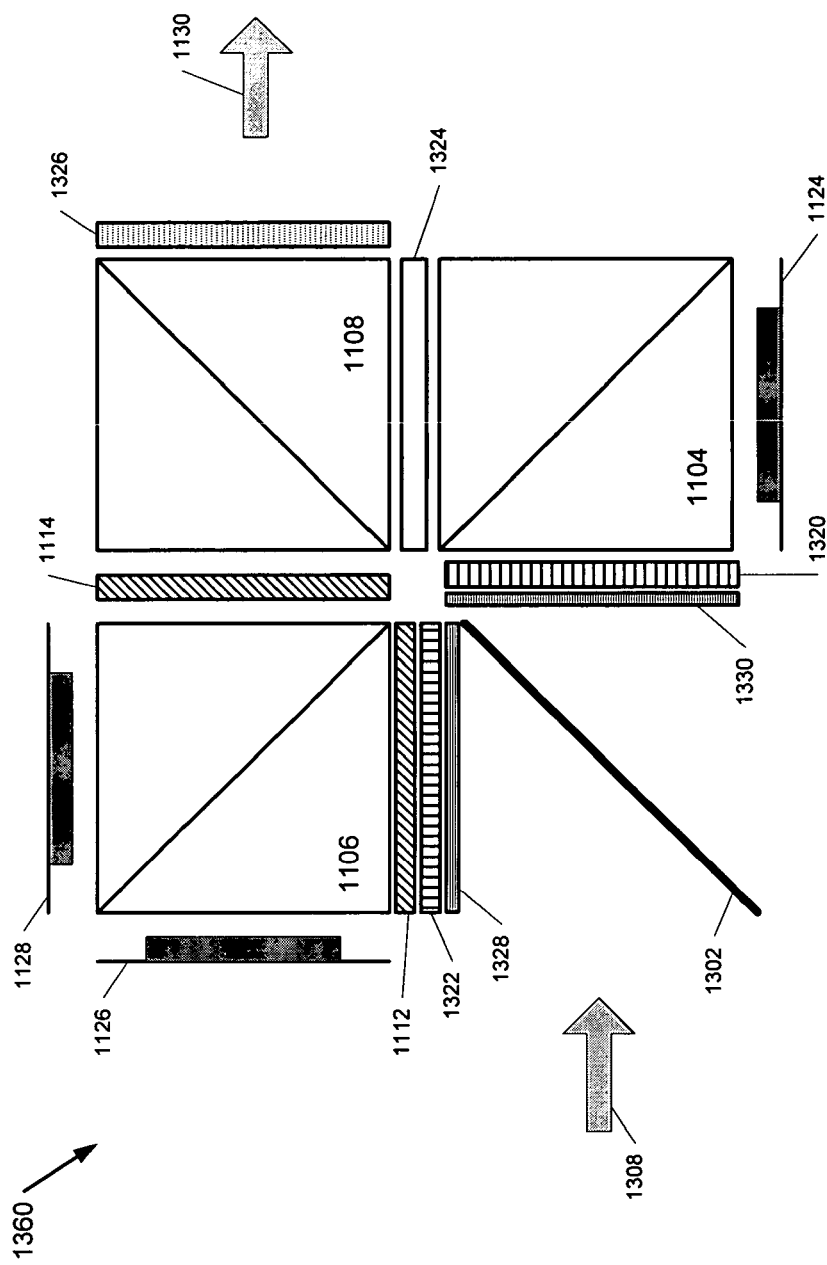
FIG. 4 is an exemplary variation of the projection device shown in FIG. 3 including extra trim dichroic filters.

FIG. 4 illustrates a projection device 1360, which is an exemplary variation of the projection device 1350 shown in FIG. 3. In the present example, the projection device 1360 is configured for an f-number that is less than or equal to f/2.8. Because of the low f-number and higher angles, the dichroic filter 1302 at the input begins to transmit some yellow and reflect some blue. Thus, to avoid color leakage at the output ports, additional extra trim dichroic filters 1328 and 1330 are added at the yellow and blue output ports of the dichroic beam splitter 1302 respectively. The extra trim dichroic filter 1328 can be configured to filter out the blue leakage in the yellow spectrum and the extra trim dichroic filter 1330 can be configured to filter out yellow leakage in the blue spectrum.

Figure 5:
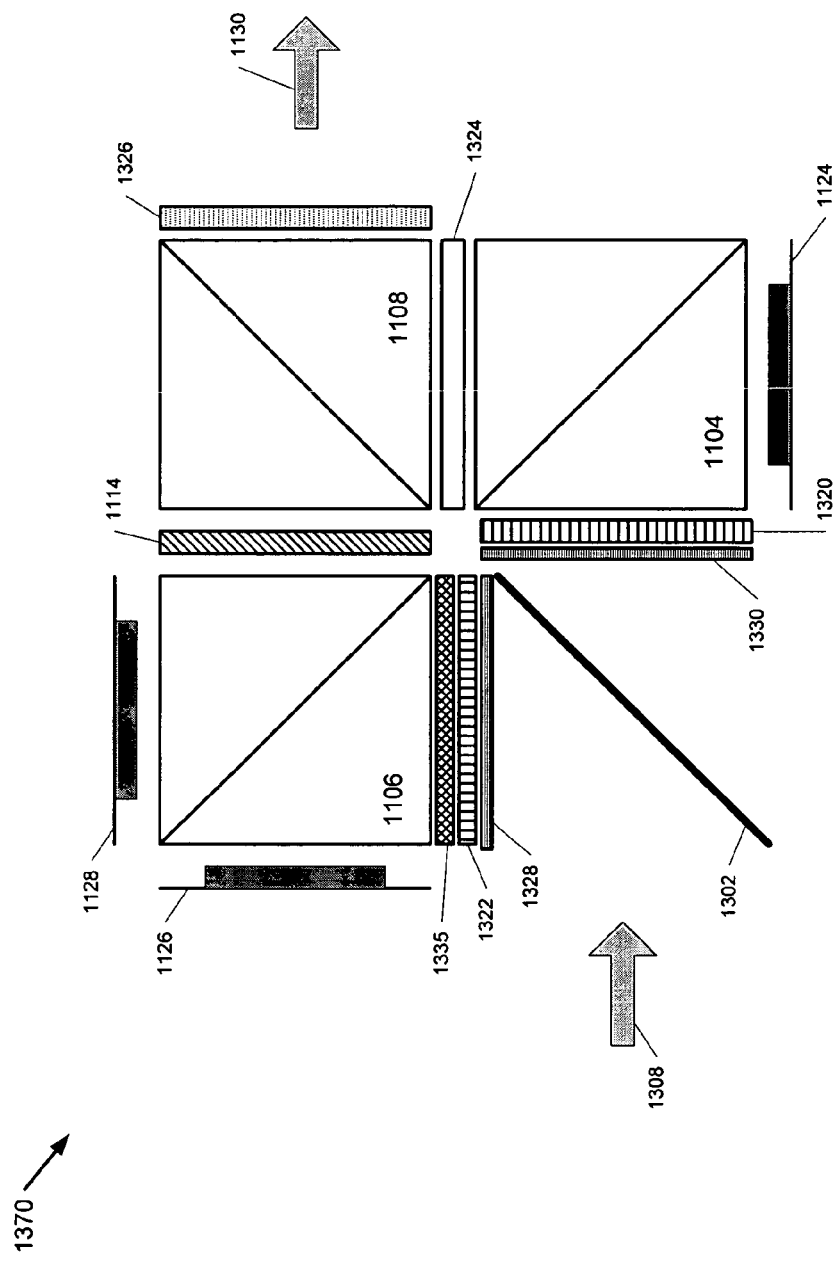
FIG. 5 is another exemplary variation of the projection device shown in FIG. 3 with a magenta/green filter for the yellow port.

FIG. 5 shows a projection device 1370, which is yet another exemplary variation of the projection device 1350 shown in FIG. 3. The projection device 1370 includes a magenta/green filter 1335 in the yellow output port of the dichroic beam splitter 1302. In the present example, the magenta/green filter 1335 replaces the red/cyan filter 1112 of the projection device 1350 of FIG. 3. The magenta/green filter 1335 can improve the manufacturability and the cost of the projection device 1370. When the magenta/green filter 1335 is used in the projection device 1370, the extra trim dichroic filters 1328 and 1330 can be added at the output port of the dichroic beam splitter 1302. In the projection device 1350 of FIG. 3, the dichroic beam splitter 1302 typically reflects some of the blue light. The red/cyan filter 1112 causes the reflected blue light to be reflected a second time by the polarizing beam splitter 1106, and the blue light heads to the green panel 1126.

The performance of the green panel 1126 does not noticeably degrade due to the blue leakage as the blue light is filtered out of the system by a combination of the magenta/green filter 1114 and the output analyzing PBS 1108. However, when the red/cyan filter 1112 is replaced by the magenta/green filter in the projection device 1370, the reflected blue light is directed to the red panel 1128. The reflected blue light can adversely affect the performance of the red panel 1128. Thus, the extra trim dichroic filter 1328 is added to filter out the reflected blue. The projection system 1370 can be used for application with any f-number.

Figure 6:
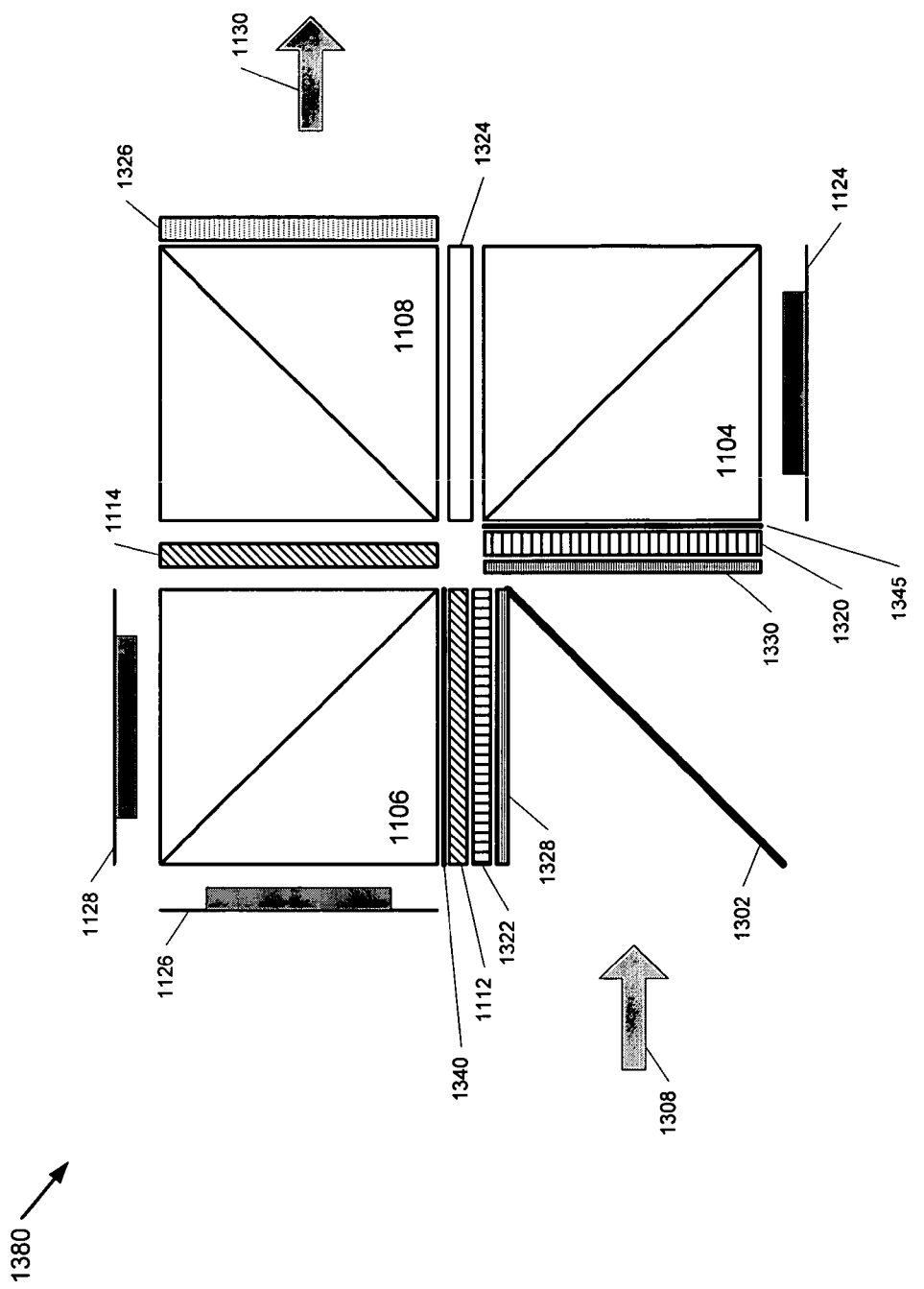
FIG. 6 illustrates yet another exemplary variation of the projection device shown in FIG. 3 with o-plates for skew ray compensation.

FIG. 6 illustrates a projection device 1380, which is yet another exemplary variation of the projection device 1350 shown in FIG. 3. In the present example, the projection device 1380 includes two oblique-plate (o-plate) compensators 1340 and 1345 for skew ray compensation. The contrast of a projection system begins to degrade when the f-number of the application goes below f/2.5 because there is no compensation for the off-axis geometrical rotation of the polarization axes of the polarizing beam splitters 1106 and 1104. The o-plate compensators 1340 and 1345 are used to compensate for low f-number illumination. The o-plate compensators 1340 and 1345 provide skew ray compensation. The number of o-plate compensators in each channel depends upon the angle of the incident light. Wider angles may require more than one o-plate compensator in each channel, while other systems may demand higher performance in one of the two reflected paths necessitating only one o-plate. In the case of an isolated blue channel, where the dichroic beam splitter 1302 reflects yellow light, the green contrast can be improved by placing an o-plate compensator at the input port of PBS 1106.

In projection systems that use cubes as beam splitting elements, there exists a geometric symmetry that can be solved by a retarder-based compensation scheme. The compensation components are sandwiched between cubes that have reflecting surfaces that are at 45 degrees to the beam propagation direction, and can be parallel or orthogonal. Retarder based compensators between cubes act to transform polarization through rotation or reflection for the parallel or orthogonal reflecting surface situations respectively. In a four-cube system or a five-cube system, retarder stacks are placed between the cubes and can be used as skew ray compensators if they have these transformation properties. In a three-cube system such as projection device 1380, this retarder solution can be implemented for the filters 1114 and 1324, which are situated between adjacent cubes. At the input, where input linear polarization is analyzed by a PBS, o-plates can be used to compensate skew rays.

Figure 7:
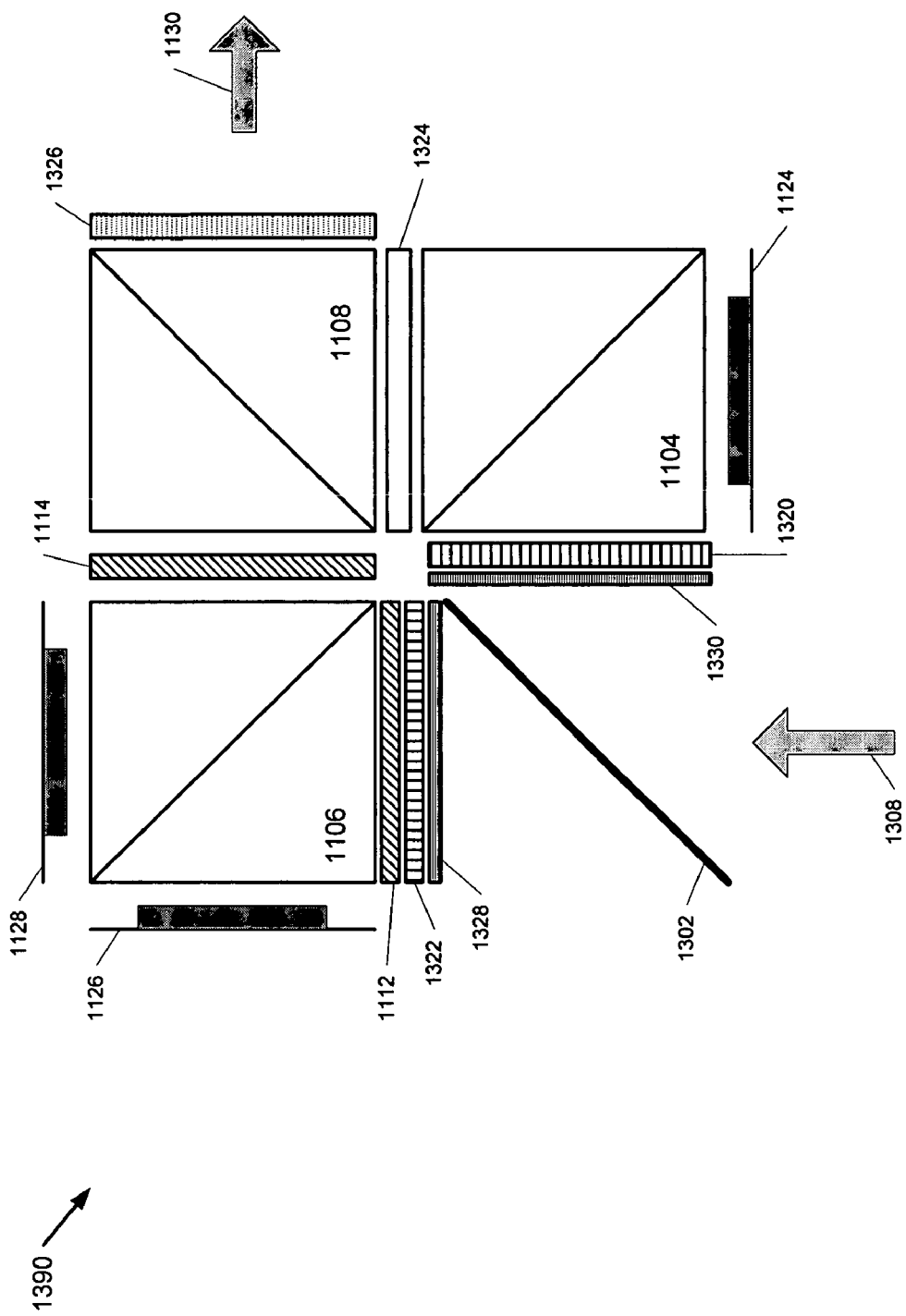
FIG. 7 shows an exemplary variation of the projection device of FIG. 3 with light input at 90 degrees.

FIG. 7 illustrates an exemplary projection system 1390, which is yet another exemplary variation of the projection device 1350 shown in FIG. 3. In the projection device 1390, the input light 1308 enters the projection device 1390 at 90°. In projection device 1390, the dichroic beam splitter 1302 reflects the blue spectrum and transmits the yellow spectrum. Typically, dichroic beam splitters are better reflectors than transmitters. In the projection device 1390, the dichroic filter 1302 reflects a small portion of yellow spectrum in the blue channel. In the present example, the extra trim dichroic filter 1330 is configured to clean up the blue channel by removing the reflected yellow spectrum. The o-plate compensators 1340 and 1345 can be added to any of the systems shown in FIGS. 2–7 for skew ray compensation.

The embodiments described above provide an efficient means of splitting and recombining color channels while maintaining good polarization and high contrast. These embodiments are configured to achieve very high sequential contrast and enhance other system performance criteria such as:

1. ANSI contrast—by reducing reflection surfaces in the projection path;
2. Soft focus—by reducing non-phase flat components and reflecting surfaces in the projection path;
3. The sequential contrast of a color—by isolating the color channel (e.g., blue);
4. Physical compactness—by introducing a 90° angle between input and output transmission axes;
5. Brightness at high white color temperatures—by increasing blue transmission; and
6. Durability—by removing the output absorbing sheet polarizer.

Further embodiments may act to improve upon some or all of these performance criteria.

The system performance criteria may be improved at the expense of sequential photopic contrast and component specification. Such improvements may be incorporated since PBS cubes with improved transmission of p-polarized light are commercially available and since sequential contrast may not be limiting when compared with off state color and ANSI contrast.

Exemplary light sources include ultra-high pressure mercury arc lamps with a small arc size such as is available from Ushio, Toshiba, Perkin-Elmer, Phoenix and others. These light sources are rich in green and blue light but are lacking in red light. These or any suitable light source may be used to provide light for the systems discussed above. Additionally, these light sources produce substantial amounts of UV light, which may degrade organic materials such as polycarbonate films. Specific embodiments covered in this patent isolate the blue channel, which is most likely to contain the possibly damaging UV light. In these cases, inorganic half-wave plates such as those made from quartz can be used between PBSs 1104 and 1108 allowing for an organic material free, UV contaminated blue channel. Exemplary embodiments for a reflecting dichroic beam splitter, a yellow transmitting dichroic, a red-cyan filter, a magenta green filter, an output PBS, a blue transmitting dichroic, an input blue polarization rotating filter, a blue PBS, and an output blue polarization filter are listed in the following charts giving typical illumination cone average performances.

| DICHROIC BEAM SPLITTER | | | | |
|---|---|---|---|---|
| Property | Typical | Range | Units | Comments |
| Glass substrate index | 1.52 | 1.5–2.0 | — | BK7. |
| Size | 40 × 40 × 1 | N/A | mm | |
| Average reflection of s-polarized blue light (Rs) 430–470 nm | 99 | 80–100 | % | Averaged over the input illumination ray set. |
| Average transmission of s-polarized Green light (Ts) 550–570 nm | 97 | 95–100 | % | |
| Red Ts 600–680 nm | 97 | 95–100 | % | |

| YELLOW TRIM TRANSMITTING DICHROIC | | | | |
|---|---|---|---|---|
| Property | Typical | Range | Units | Comments |
| Blue transmission 430–490 nm | 1 | 0–2 | % | |
| Green transmission 530–600 nm | 96 | 94–100 | % | |
| Red transmission 600–680 nm | 97 | 95–100 | % | |
| 50% transmission | 515 | 505–525 | nm | |

RED CYAN FILTER

| Property | Typical | Range | Units | Comments |
|---|---|---|---|---|
| Blue Crossed polarizer - transmission 430–480 nm (Bx) | <2 | <10 | % | Not critical |
| Gx (530–560 nm) | 0.5 | 0–0.7 | % | |
| Rx (615–680 nm) | 98.5 | 97–100 | % | |
| Blue parallel-polarizer transmission (Bp) | >95 | >90% | % | Not critical |
| Gp | 98 | 96–100 | % | |
| Rp | 98 | 96–100 | % | |
| Yellow 50% point | 600 | 595–605 | nm | |
| General Comments | | | | This may be a free-standing part with anti-reflective coatings evaporated directly onto the polycarbonate. |

RED GREEN PBS

| Property | Typical | Range | Units | Comments |
|---|---|---|---|---|
| Glass index | 1.85 (e.g., PBH56) | 1.5–2.0 | — | A low coefficient of optical elasticity reduces stress induced birefringence. |
| Size | 22 × 22 × 28 | N/A | mm | |
| Blue Tp 430–520 nm | 90 | 80–100 | % | Not critical |
| Yellow Tp 530–680 nm | 96 | 94–100 | % | |
| Blue Ts | 1 | <2 | % | Not critical |
| Yellow Ts 530–680 nm | 0.1 | <0.2 | % | |
| External surfaces | | | | Input and panels ports may be antireflective coated for <0.5% reflection over the visible spectrum. |

MAGNETA GREEN FILTER

| Property | Typical | Range | Units | Comments |
|---|---|---|---|---|
| Blue Crossed polarizer - transmission 430–480 nm (Bx) | Don't care (D/C) | D/C | | |
| Gx (530–560 nm) | 1 | 0–2 | % | |
| Rx (615–680 nm) | 98 | 97–99 | % | |
| Blue parallel-polarizer transmission (Bp) | D/C | D/C | | |
| Gp | 97 | 96–99 | % | |
| Rp | 0.25 | 0–0.5 | % | |
| Cyan 50% point | 520 | <530 | nm | |
| Yellow 50% point | 570 | 565–575 | nm | |
| General Comments | | | | This filter may be bonded between glass substrates with conforming glue, such as silicone, and then the glass is bonded to the adjacent PBSs to avoid reflections. Skew ray compensating. |

OUTPUT PBS

| Property | Typical | Range | Units | Comments |
|---|---|---|---|---|
| Glass index | 1.65 (SF2) | 1.5–2.0 | — | |
| Size | 27 × 27 × 34 | N/A | mm | |
| Blue Tp 430–500 nm | D/C | D/C | % | |
| Green Tp 500–600 nm | 90 | 85–97 | % | |
| Red Tp 600–680 nm | 90 | 85–98 | % | |
| Blue Ts | 0.1% | 0–0.2 | % | |
| Yellow Ts 500–680 nm | D/C | | | |

BLUE TRIM TRANSMITTING DICHROIC

| Property | Typical | Range | Units | Comments |
|---|---|---|---|---|
| Blue transmission 430–480 nm | 97 | 96–99 | % | |
| Yellow transmission 510–680 nm | 0.5 | 0–1 | % | |
| 50% transmission | 485 | 480–490 | nm | |

BLUE PBS

| Property | Typical | Range | Units | Comments |
|---|---|---|---|---|
| Glass index | 1.85 (e.g., PBH56) | 1.5–2.0 | — | A low coefficient of optical elasticity reduces stress induced birefringence. |
| Size | 22 × 22 × 28 | N/A | mm | |
| Blue Tp 430–520 nm | 95 | >93 | % | |
| Yellow Tp 520–680 nm | D/C | | | |
| Blue Ts | 0.3 | <0.5 | % | |
| Yellow Ts 520–680 nm | D/C | | | |
| External surfaces | | | | Input and panels ports may be antireflective coated for <0.5% reflection over the visible spectrum. |

OUTPUT BLUE POLARIZATION ROTATING FILTER

| Property | Typical | Range | Units | Comments |
|---|---|---|---|---|
| Blue parallel polarizer - transmission 430–470 nm (Bp) | 1 | <2 | % | |
| Blue crossed-polarizer transmission (Bx) | 97 | >95 | % | |
| Yp (540–680) | 97 | 95–100 | % | |
| Yx | 2 | 0–4 | % | |

Although the exemplary embodiments described herein may be described in reference to specific colors or combinations of colors, it should be understood that other color combinations are also possible. For example, the color filters can be any combination of colors including Red/Blue, Blue/Green, Red/Green, an additive primary and its complementary subtractive primary or any other color pair as system criteria dictate.

As used herein, rotation is not limited to a pure optical rotation but also includes any transformation that results in optical transformation or other effects that result in apparent optical rotation. For example, a half-wave plate at 45° can transform a linear state into an orthogonal linear state via retardation but not through rotation.

Although several embodiments and its advantages have been described in detail, it should be understood that changes, substitutions, transformations, modifications, variations, permutations and alterations may be made therein without departing from the teachings of the present application, the spirit and the scope of the invention being set forth by the appended claims. Further, the reference in this application to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the reference to "Invention" included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A color management architecture for managing red, blue, and green primary colors from a substantially white input light, the architecture having an aggregate structure comprising:

an input dichroic beam splitting element configured to split the input light into a first portion light and a second portion light, wherein the first portion light contains a first non-green primary color from the input light and wherein the second portion light contains a second non-green primary color from the input light and a green primary color from the input light, and wherein the first portion light has a path substantially perpendicular to a path of the second portion light;

a first polarizing beam splitter adjacent to the input dichroic beam splitting element and configured to receive the first portion light from the input dichroic beam splitting element;

a first reflective panel adjacent to the first polarizing beam splitter and configured to modulate and reflect the first portion light;

a second polarizing beam splitter adjacent to the input dichroic beam splitting element and configured to receive the second portion light from the input dichroic beam splitting element and to split the second portion light into a third portion light containing the second non-green primary color and a fourth portion light containing the green primary color, wherein the third portion light has a path substantially perpendicular to a path of the fourth portion light;

a second reflective panel adjacent to the second polarizing beam splitter and opposite the input dichroic beam splitting element, and configured to modulate and reflect the third portion light;

a third reflective panel adjacent to the second polarizing beam splitter and located on a side of the aggregate structure not including the first or second reflective panels, wherein the third reflective panel is configured to modulate and reflect the fourth portion light; and a third polarizing beam splitter adjacent to the first and second polarizing beam splitters and configured to combine the modulated and reflected lights of the first, third, and fourth portions to form an output light, wherein the third polarizing beam splitter provides an output for the output light on a side of the aggregate structure not having the first, second, or third reflective panels.

2. A color management architecture according to claim 1, further comprising:

a polarizing element optically between the input dichroic beam splitting element and the first polarizing beam splitter.

3. A color management architecture according to claim 1, further comprising:

a polarizing element optically between the input dichroic beam splitting element and the second polarizing beam splitter.

4. A color management architecture according to claim 1, further comprising:

a first polarizing element optically between the input dichroic beam splitting element and the first polarizing beam splitter; and a second polarizing element optically between the input dichroic beam splitting element and the second polarizing beam splitter.

5. A color management architecture according to claim 1, further comprising:
a dichroic filter optically between the input dichroic beam splitting element and the first polarizing beam splitter and configured to substantially transmit the first portion light and substantially block the second portion light.

6. A color management architecture according to claim 1, further comprising:
a dichroic filter optically between the input dichroic beam splitting element and the second polarizing beam splitter and configured to substantially transmit the second portion light and substantially block the first portion light.

7. A color management architecture according to claim 1, further comprising:
a first dichroic filter optically between the input dichroic beam splitting element and the first polarizing beam splitter and configured to substantially transmit the first portion light and substantially block the second portion light; and
a second dichroic filter optically between the input dichroic beam splitting element and the second polarizing beam splitter and configured to substantially transmit the second portion light and substantially block the first portion light.

8. A color management architecture according to claim 1, further comprising:
a polarization rotation element optically between the input dichroic beam splitting element and the second polarizing beam splitter and configured to rotate at least one of the third and fourth portions.

9. A color management architecture according to claim 8, wherein the polarization rotation element is selected from the group consisting of a magenta/green filter and a red/cyan filter.

10. A color management architecture according to claim 1, further comprising:
a polarization rotation element optically between the second polarizing beam splitter and the third polarizing beam splitter and configured to rotate the modulated and reflected lights of at least one of the third and fourth portions.

11. A color management architecture according to claim 10, wherein the polarization rotation element is further configured to compensate the modulated and reflected lights of at least one of the third and fourth portions for skew rays.

12. A color management architecture according to claim 1, further comprising:
a first polarization rotation element optically between the input dichroic beam splitting element and the second polarizing beam splitter and configured to rotate at least one of the third and fourth portions; and
a second polarization rotation element optically between the second polarizing beam splitter and the third polarizing beam splitter and configured to rotate the modulated and reflected lights of at least one of the third and fourth portions.

13. A color management architecture according to claim 12, wherein
the first polarization rotation element is selected from the group consisting of a magenta/green filter and a red/cyan filter; and
the second polarization rotation element is further configured to compensate the modulated and reflected lights of at least one of the third and fourth portions for skew rays.

14. A color management architecture according to claim 1, further comprising:
a oblique-plate compensator optically between the input dichroic beam splitting element and the first polarizing beam splitter.

15. A color management architecture according to claim 1, further comprising:
a oblique-plate compensator optically between the input dichroic beam splitting element and the second polarizing beam splitter.

16. A color management architecture according to claim 1, further comprising:
a first oblique-plate compensator optically between the input dichroic beam splitting element and the first polarizing beam splitter; and
a second oblique-plate compensator optically between the input dichroic beam splitting element and the second polarizing beam splitter.

17. A method of projecting light through an aggregate structure for color management of red, blue, and green primary colors from a substantially white input light, the method comprising:
splitting a substantially white input light into a first portion light and a second portion light with a dichroic beam splitter, wherein the first portion light contains a first non-green primary color from the input light and wherein the second portion light contains a second non-green primary color from the input light and a green primary color from the input light, and wherein the first portion light has a path substantially perpendicular to a path of the second portion light;
directing the first portion of light to a first panel with a first polarizing beam splitter located adjacent to the dichroic beam splitter, the first panel located adjacent to the first polarizing beam splitter for modulating and reflecting the first portion of light;
splitting the second portion of light into a third portion light containing the second non-green primary color and a fourth portion light containing the green primary color with a second polarizing beam splitter located adjacent to the dichroic beam splitter, wherein the third portion light has a path substantially perpendicular to a path of the fourth portion light;
directing the third portion of light to a second panel with the second polarizing beam splitter, the second panel located adjacent to the second polarizing beam splitter and opposite the dichroic beam splitter for modulating and reflecting the third portion of light;
directing the fourth portion of light to a third panel with the second polarizing beam splitter, wherein the third panel is located adjacent to the second polarizing beam splitter and located on a side of the aggregate structure not including the first or second panels, the third panel modulating and reflecting the fourth portion of light;
combining the modulated and reflected third and fourth portions of light with the second polarizing beam splitter to form a fifth portion of light;
combining the modulated and reflected first portion of light with the fifth portion of light using a third polarizing beam splitter to form an output light, the third polarizing beam splitter located adjacent to the first and second polarizing beam splitters; and
outputting the output light from the third polarizing beam splitter on a side of the aggregate structure not having the first, second, or third panels.

18. A method according to claim 17, further comprising:
compensating light of the first portion with a first oblique-plate compensator; and
compensating light of the second portion with a second oblique-plate compensator.

19. A method according to claim 17, further comprising:
compensating light of the fifth portion before combining the modulated and reflected first portion of light with the fifth portion of light.

20. A method according to claim 17, wherein the light of the fifth portion is compensated using a polarization rotation element.

21. A color management architecture for managing red, blue, and green primary colors from a substantially white input light, the architecture comprising:
an input dichroic beam splitting element configured to split the input light into a first portion and a second portion, wherein the first portion contains a first non-green primary color from the input light and wherein the second portion contains a second non-green primary color from the input light and a green primary color from the input light;
a first polarizing beam splitter configured to receive the first portion light containing the first non-green primary color from the input dichroic beam splitting element;
a first reflective panel adjacent to the first polarizing beam splitter and configured to modulate and reflect the first portion light; p1 a second polarizing beam splitter configured to receive the second portion light and to split the second portion light into a third portion light containing the second non-green primary color and a fourth portion light containing the green primary color; -p1 a second reflective panel adjacent to the second polarizing beam splitter and configured to modulate and reflect the third portion light;
a third reflective panel adjacent to the second polarizing beam splitter and configured to modulate and reflect the fourth portion light;
a third polarizing beam splitter adjacent to the first and second polarizing beam splitters and configured to combine the modulated and reflected lights of the first, third, and fourth portions to form an output light; and
at least one skew ray compensator optically positioned and configured to compensate the lights of at least one of the first, second, third, and fourth portions.

22. A color management architecture according to claim 21, further comprising:
a polarizing element optically between the input dichroic beam splitting element and the first polarizing beam splitter.

23. A color management architecture according to claim 21, further comprising:
a polarizing element optically between the input dichroic beam splitting element and the second polarizing beam splitter.

24. A color management architecture according to claim 21, further comprising:
a first polarizing element optically between the input dichroic beam splitting element and the first polarizing beam splitter; and
a polarizing element optically between the input dichroic beam splitting element and the second polarizing beam splitter.

25. A color management architecture according to claim 21, further comprising:
a dichroic filter optically between the input dichroic beam splitting element and the first polarizing beam splitter and configured to substantially transmit the first portion light and substantially block the second non-green primary color and the green primary color.

26. A color management architecture according to claim 21, further comprising:
a dichroic filter optically between the input dichroic beam splitting element and the second polarizing beam splitter and configured to substantially transmit the second portion light and substantially block the first non-green primary color.

27. A color management architecture according to claim 21, further comprising:
a first dichroic filter optically between the input dichroic beam splitting element and the first polarizing beam splitter and configured to substantially transmit the first portion light and substantially block the second non-green primary color and the green primary color; and
a second dichroic filter optically between the input dichroic beam splitting element and the second polarizing beam splitter and configured to substantially transmit the second portion light and substantially block the first non-green primary color.

28. A cola management architecture according to claim 21, further comprising:
a polarization rotation element optically between the input dichroic beam splitting element and the second polarizing beam splitter and configured to rotate at least one of the second non-green primary color and the green primary color.

29. A color management architecture according to claim 28, wherein the polarization rotation element is selected from the group consisting of a magenta/green filter and a red/cyan filter.

30. A color management architecture according to claim 21, further comprising:
a polarization rotation element optically between the second polarizing beam splitter and the third polarizing beam splitter and configured to rotate the modulated and reflected lights of at least one of the third and fourth portions.

31. A color management architecture according to claim 30, wherein the polarization rotation element is further configured to compensate modulated and reflected lights of at least one of the third and fourth portions for skew rays.

32. A color management architecture according to claim 21, further comprising:
a first polarization rotation element optically between the input dichroic beam splitting element and the second polarizing beam splitter and configured to rotate at least one of the second non-green primary color and the green primary color; and
a second polarization rotation element optically between the second polarizing beam splitter and the third polarizing beam splitter and configured to rotate the modulated and reflected lights of at least one of the third and fourth portions.

33. A color management architecture according to claim 32, wherein
the first polarization rotation element is selected from the group consisting of a magenta/green filter and a red/cyan filter; and
the second polarization rotation element is further configured to compensate modulated and reflected lights of at least one of the third and fourth portions for skew rays.

34. A color management architecture according to claim 21, wherein the at least one skew ray compensator is an oblique-plate skew ray compensator.

35. A color management architecture according to claim 34, further comprising:
   a oblique-plate skew ray compensator optically between the input dichroic beam splitting element and the first polarizing beam splitter.

36. A color management architecture according to claim 34, further comprising:
   a oblique-plate skew ray compensator optically between the input dichroic beam splitting element and the second polarizing beam splitter.

37. A color management architecture according to claim 34, further comprising:
   a first oblique-plate skew ray compensator optically between the input dichroic beam splitting element and the first polarizing beam splitter; and
   a second oblique-plate skew ray compensator optically between the input dichroic beam splitting element and the second polarizing beam splitter.

38. A color management architecture comprising:
   an input dichroic beam splitting element configured to split an input light into a first portion and a second portion;
   a first light directing element configured to receive light of the first portion from the input dichroic beam splitting element;
   a first reflective panel adjacent to the first light directing element and configured to modulate and reflect light of the first portion;
   a second light directing element configured to split light of the second portion into a third portion and a fourth portion;
   a second reflective panel adjacent to the second light directing element and configured to modulate and reflect light of the third portion;
   a third reflective panel adjacent to the second light directing element and configured to modulate and reflect light of the fourth portion;
   a third light directing element adjacent to the first and second light directing elements and configured to combine modulated and reflected light of the first, third, and fourth portions to form an output light; and
   at least one skew ray compensator optically positioned and configured to compensate the lights of at least one of the first, second, third, and fourth portions.

39. A color management architecture according to claim 38, further comprising:
   a polarizing element optically between the input dichroic beam splitting element and the first light directing element.

40. A color management architecture according to claim 38, further comprising:
   a polarizing element optically between the input dichroic beam splitting element and the second light directing element.

41. A color management architecture according to claim 38, further comprising:
   a first polarizing element optically between the input dichroic beam splitting element and the first light directing element; and
   a second polarizing element optically between the input dichroic beam splitting element and the second light directing element.

42. A color management architecture according to claim 38, further comprising:
   a dichroic filter optically between the input dichroic beam splitting element and the first light directing element and configured to transmit light of the first portion.

43. A color management architecture according to claim 38, further comprising:
   a dichroic filter optically between the input dichroic beam splitting element and the second light directing element and configured to transmit light of the second portion.

44. A color management architecture according to claim 38, further comprising:
   a first dichroic filter optically between the input dichroic beam splitting element and the first light directing element and configured to transmit light of the first portion; and
   a second dichroic filter optically between the input dichroic beam splitting element and the second light directing element and configured to transmit light of the second portion.

45. A color management architecture according to claim 38, further comprising:
   a polarization rotation element optically between the input dichroic beam splitting element and the second light directing element and configured to rotate a portion of the wavelength spectrum of the second portion.

46. A color management architecture according to claim 45, wherein the polarization rotation element is selected from the group consisting of a magenta/green filter and a red/cyan filter.

47. A color management architecture according to claim 38, further comprising:
   a polarization rotation element optically between to second light directing element and the third light directing element and configured to rotate the lights of at least one of the third and fourth portions.

48. A color management architecture according to claim 38, further comprising:
   a first polarization rotation element optically between the input dichroic beam splitting element and the second light directing element and configured to rotate a portion of the wavelength spectrum of the second portion;
   a second polarization rotation element optically between the second light directing element and the third light directing element and configured to rotate the lights of at least one of the third and fourth portions.

49. A color management architecture according to claim 48, wherein the first polarization rotation element is selected from the group consisting of a magenta/green filter and a red/cyan filter.

50. A color management architecture according to claim 38, further comprising:
   a oblique-plate compensator optically between the input dichroic beam splitting element and the first light directing element and configured to compensate the light of the first portion for skew rays.

51. A color management architecture according to claim 38, further comprising:
   a oblique-plate compensator optically between the input dichroic beam splitting element and the second light directing element and configured to compensate the light of the second portion for skew rays.

52. A color management architecture according to claim 38, further comprising:
   a first oblique-plate compensator optically between the input dichroic beam splitting element and the first light directing element and configured to compensate the light of the first portion for skew rays; and
   a second oblique-plate compensator optically between the input dichroic beam splitting element and the second light directing element and configured to compensate the light of the second portion for skew rays.

* * * * *

UNITED STATES PATENT AND TRADEMARK OFFICE
CERTIFICATE OF CORRECTION

PATENT NO. : 7,002,752 B2  
APPLICATION NO. : 10/713548  
DATED : February 21, 2006  
INVENTOR(S) : Chen et al.

It is certified that error appears in the above-identified patent and that said Letters Patent is hereby corrected as shown below:

On the Title page insert:  
(*) Notice: Subject to any disclaimer, the term of this patent is extended or adjusted under 35 U.S.C. 154(b) by 44 days.

Signed and Sealed this

Twenty-ninth Day of August, 2006

JON W. DUDAS  
*Director of the United States Patent and Trademark Office*